United States Patent
Brutsaert

(10) Patent No.: US 6,269,824 B1
(45) Date of Patent: Aug. 7, 2001

(54) SLIDE-OUT

(76) Inventor: Louis Marcel Brutsaert, Kortrijkstraat 343, B-8930 Menen (BE)

(*) Notice: Subject to any disclaimer, the term of this patent is extended or adjusted under 35 U.S.C. 154(b) by 0 days.

(21) Appl. No.: 09/492,807

(22) Filed: Jan. 28, 2000

(51) Int. Cl.$^7$ ..................................................... E04F 10/06
(52) U.S. Cl. ..................................... 135/88.12; 296/26.13; 296/175; 296/163; 160/67; 160/71; 52/67; 135/88.1
(58) Field of Search ................................. 135/88.1, 88.11, 135/88.12, 88.01, 903; 52/74, 67; 296/163, 26.13, 26, 175, 171; 160/67, 71

(56) References Cited

U.S. PATENT DOCUMENTS

| | | | |
|---|---|---|---|
| 4,171,013 | * 10/1979 | Clark | 135/88.11 |
| 4,733,683 | * 3/1988 | Pozzi | 135/88.11 |
| 5,171,056 | * 12/1992 | Faludy | 135/88.11 |
| 5,280,687 | * 1/1994 | Boiteau | 52/67 |
| 5,752,536 | * 5/1998 | Becker | 135/88.1 |
| 5,860,440 | * 1/1999 | Murray | 135/88.12 |

\* cited by examiner

Primary Examiner—Beth A. Stephan
(74) Attorney, Agent, or Firm—Bacon & Thomas, PLLC

(57) ABSTRACT

A slide-out, intended for being applied to an outer wall of a caravan, mobile home or similar vehicle which is provided with an extensible part (4). The slide-out includes at least a wind-up roller (6) for the tent cloth (5). The wind-up roller (6) is provided in a closed casing (2) which is attached at the wall of the caravan. The free extremity of the tent cloth (5) is fixed at the outermost upper corner (9) of an extensible part (4).

7 Claims, 2 Drawing Sheets

SLIDE-OUT

BACKGROUND OF THE INVENTION

1. Field of the Invention

The present invention relates to a slide-out, more particularly a tent which is provided above the roof of an extensible space in a caravan or similar vehicle, whereby such slide-out, as known, is applied, on one hand, for keeping off dirt and, on the other hand, for protecting such extensible part against weather influences.

2. Description of the Related Art

It is known that vehicles such as caravans and mobile homes often are provided with extensible parts, the intention of which is to be able to enlarge the interior space of such caravan, mobile home or similar vehicle when in use.

It is also known that such extensible parts of the vehicle are usually provided with a slide-out, whereby one free extremity thereof is connected to the wall of the caravan, mobile home or similar vehicle and whereby the wind-up roller of such slide-out is situated above the outermost upper edge of such extensible part.

In such a device the tent cloth of the slide-out wind off automatically during the extension movement of such extensible part, whereas during the sliding-in movement of such extensible part, springs will provide for the rewinding the tent cloth.

A big disadvantage connected with such roof tents is that the wind-up roller is always situated on the extensible part of the caravan, mobile home or similar vehicle, such that means have to be provided to prevent the wound-up slide-out from an undesired unwinding.

Another disadvantage of such roof tents attached to a vehicle is that, when the vehicle is moving, the wind can blow freely between the windings of the wound-up slide-out, and as a result of which the latter often becomes inflated during driving.

Yet another disadvantage of such prior art slide-out is that the unit formed by the wind-up roller and the tent cloth will sag rapidly.

SUMMARY OF THE INVENTION

The present invention provides a slide-out which totally excludes the aforementioned and other disadvantages of such known roof tents.

To this aim, a slide-out according to the invention which is intended to be attached at a wall of a caravan, mobile home or similar vehicle which is provided with an extensible part, substantially consists at least of a wind-up roller for a tent cloth, whereby this wind-up roller is provided in a substantially closed casing which is fixed at the wall of the caravan or similar surface, whereby a free extremity of the tent cloth is fixed at an outermost upper corner of an extensible part of the caravan or similar vehicle.

For the intention of detailing the characteristics of the invention, hereafter, without any limitative character, a preferred embodiment of a slide-out according to the invention is described, with reference to the accompanying drawings.

DETAILED DESCRIPTION OF THE PREFERRED EMBODIMENTS

Figure 1:
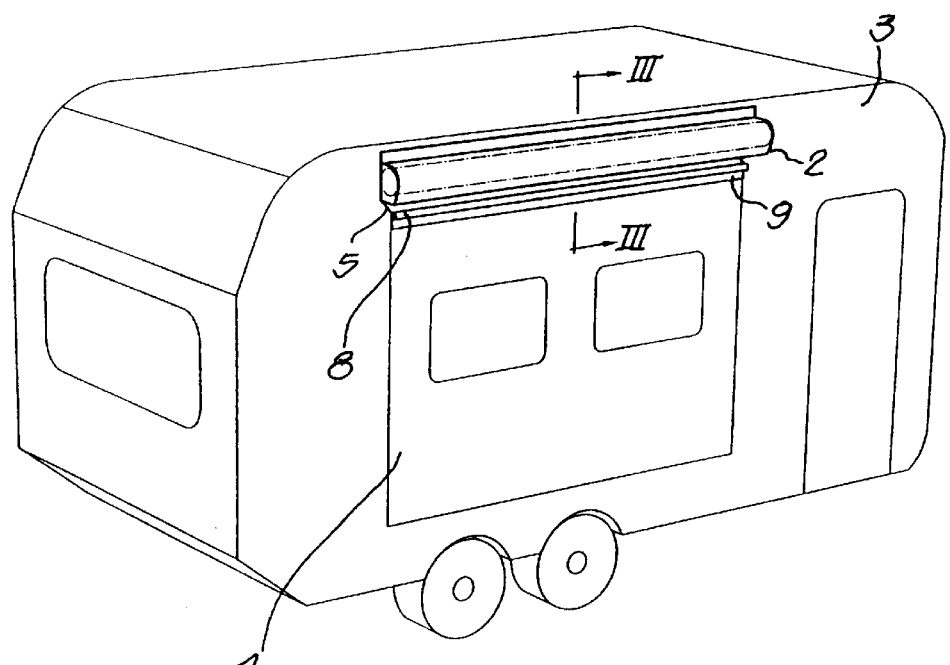
FIG. 1 schematically shows a caravan which is provided with a slide-out according to the invention in a driving position.
Figure 2:
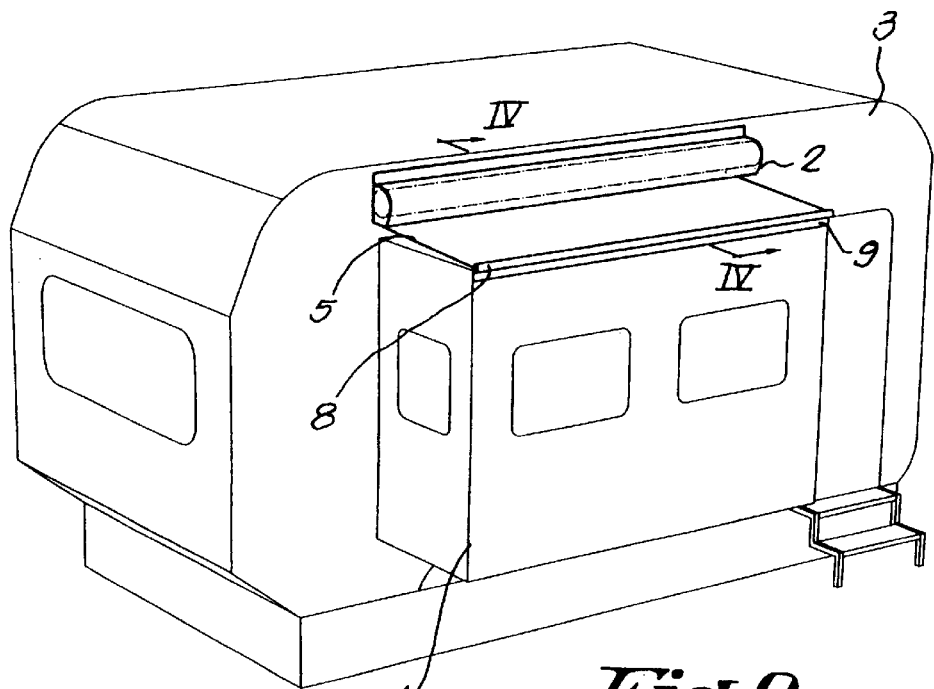
FIG. 2 is a view similar to that of FIG. 1, but with the extensible part of the caravan in a usage position.
Figure 3:
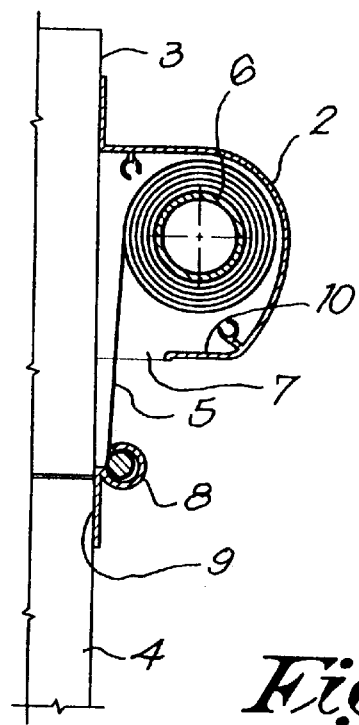
FIG. 3, shown in a large scale, represents a schematic cross-section along line III—III of FIG. 1.
Figure 4:
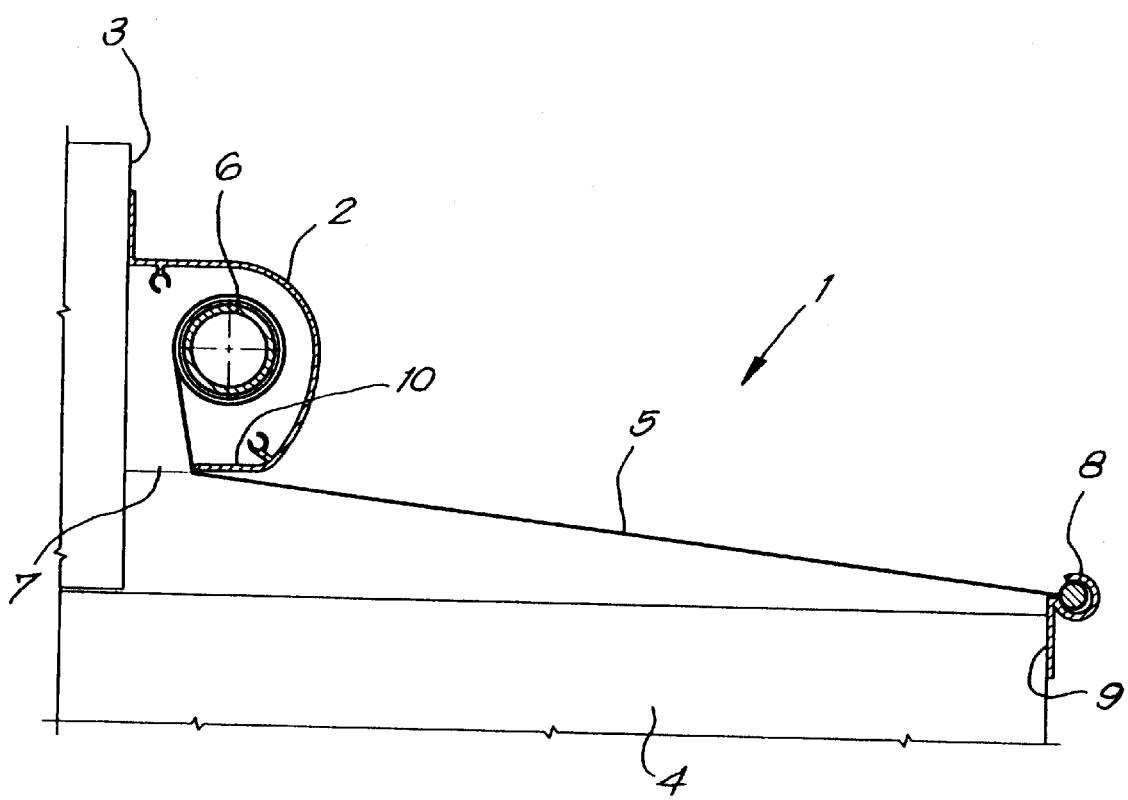
FIG. 4, shown at a larger scale, represents a schematic cross-section along line IV—IV of FIG. 3.

With reference to FIGS. 1 and 3, the slide-out 1 according to the invention in a wound-up position is situated in a casing 2, which is attached at a wall of the vehicle or caravan 3 in a suitable manner, above an extensible part 4 which is provided in such caravan or similar vehicle.

The casing 2 includes a top wall that extends toward a vehicle wall engaging portion that extends in the same direction as the top wall and terminates at an edge 10 that defines an outer limit of the lower opening of the casing 2. The edge 10 terminates inward of the vehicle wall engaging portion.

The tent cloth 5 is wound up on a wind-up roller 6 which is provided with suitable torsion springs that are tensioned during winding and therefore are capable of rewinding the tent cloth 5 when desired.

The wind-up roller 6 which is provided is freely rotatable in the casing 2 which is closed off completely at the top as well as at the extremities to protect the wind-up roller 6 from the elements including wind and water.

At the bottom of the casing 2, between the wall of the caravan 3 and the casing 2, an opening 7 is provided through which the tent cloth 5 can pass. The tent cloth 5 is fixed at its free extremity in a suitable manner to a profile element 8 which is provided at an outermost upper edge 9 of said extensible part 4. The free extremity of the tent cloth 5 includes a cooperating connector configured to engage the profile element 8 in secured relationship.

The casing 2 is positioned in such a manner with respect to the upper wall of the extensible part 4, to the profile 8 respectively, such that the tent cloth 5 is always situated at an angle which declines towards the aforementioned profile 8, in such a manner that the tent cloth 5 during winding-up scrapes along the edge 10 of the casing 2, so that dirt which possibly is situated on the tent cloth 5, will be scraped off and kept away from the slide-out.

The inventive slide-out is obtained thereby which offers protection against both the accumulation of dirt and the effects of weather, whereby the tent cloth 5 in the wound-up condition is stored in a substantially closed casing 2, via the opening 7, such that the tent cloth 5 is stored away, completely protected and it is not necessary to provide additional blocking means in order to keep the tent cloth in this wound-up condition. Further, a sagging of the slide-out is prevented since the casing 2 protects the slide-out from wind.

It is preferred that the casing 2 is attached to the wall of a vehicle above the intersection of the wall and the upper side of the extensible part 4.

The present invention is in no way limited to the slide-out described by way of example and represented in the drawings, and such slide-out may be realized in a variety of forms and dimensions while still remaining within the scope of the invention.

What is claimed is:

1. A slide-out for use with an extensible part of a vehicle that is extensible out of an outer wall of the vehicle, the slide-out comprising:

a tent cloth having a free extremity;

a wind-up roller on to which the tent cloth is wound;

a substantially closed casing covering and supporting the wind-up roller, the casing attachable to an outer wall of a vehicle from which an extensible part is extendible, the casing having a lower opening through which the free extremity of the tent cloth may pass;

a profile element configured and dimensioned so as to be attachable to an outermost upper edge of an extensible part of a vehicle;

said free extremity of said tent cloth including a cooperating connector configured to engage said profile element in secured relationship;

whereby, when the profile element is attached to an extensible part of a vehicle, and the casing is attached to a wall of a vehicle from which the extensible part is extendible at a location above the extendible part, and further when the cooperating connector at the free extremity of the tent cloth is secured to the profile element, the tent cloth will extend through the lower opening of the casing to unwind from the windup roller when the profile element moves away from the casing with an outermost upper edge of an extensible part of a vehicle wall to which the profile element may be attached.

2. The slide-out according to claim 1, wherein the wind-up roller is provided with torsion springs arranged to rewind the tent cloth on the roller.

3. The slide-out according to claim 1, wherein the casing comprises a top wall that extends towards a vehicle wall engaging portion and a bottom wall having a portion that extends in the same direction as the top wall and terminates at an edge that defines an outer limit of said lower opening, said edge terminating inward of said vehicle wall engaging portion.

4. The slide-out according to claim 3, including a torsion rewind spring connected to said roller, and wherein the edge of the bottom wall of the casing is in contact with the tent cloth when the tent cloth is retracted by the roller under the influence of said rewind spring into the casing from an unwound position such that dirt accumulated on an upper surface of the tent cloth will be removed by scraping contact between the upper surface of the tent cloth and the edge.

5. A slide-out for use with an extensible part of a vehicle that is extensible out of and away from an outer wall of the vehicle, comprising:

a vehicle having an outer wall and an extensible part having an upper side and an outermost upper corner, said extensible part extendible out of and away from said wall so that said outermost upper corner is located away from said wall;

a tent cloth having a free extremity;

a wind-up roller on to which the tent cloth is wound;

a substantially closed casing covering and supporting the wind-up roller, the casing attached to the wall of the vehicle above the intersection of the wall and the upper side of the extensible part, the casing having a lower opening located above said upper side of said extensible part and through which the free extremity of the tent cloth may pass;

a profile element attached to said outermost upper edge of said extensible part;

said free extremity of said tent cloth including a cooperating connector configured to engage said profile element in secured relationship;

whereby, when the cooperating connector at the free extremity of the tent cloth is secured to the profile element, the tent cloth will unwind from the wind-up roller when the profile element moves away from the casing with the outermost upper edge of the extensible part when the extensible part is moved out of and away from the wall of the vehicle and the tent cloth will cover the intersection of the upper section of the extensible part with the wall from which it extends in such unwound condition.

6. The slide-out according to claim 5, wherein the casing comprises a top wall that extends towards and terminates at a vehicle wall engaging portion that engages the vehicle wall and a bottom wall having a portion that extends in the same direction as the top wall and terminates at an edge that defines an outer limit of said lower opening, said edge terminating at a location spaced away from of said vehicle wall.

7. The slide-out according to claim 6, including a torsion rewind spring connected to said roller, and wherein the edge of the bottom wall of the casing is in contact with the tent cloth when the tent cloth is retracted by the roller under the influence of said rewind spring into the casing from an unwound position such that dirt accumulated on an upper surface of the tent cloth will be removed by scraping contact between the upper surface of the tent cloth and the edge.

* * * * *